United States Patent
Paya

[11] Patent Number: 5,577,867
[45] Date of Patent: Nov. 26, 1996

[54] CUTTER INSERT

[75] Inventor: José A. Paya, Mühlheim, Germany

[73] Assignee: Widia GmbH, Essen, Germany

[21] Appl. No.: 232,209

[22] PCT Filed: Oct. 1, 1992

[86] PCT No.: PCT/DE92/00006

§ 371 Date: Aug. 1, 1994

§ 102(e) Date: Aug. 1, 1994

[87] PCT Pub. No.: WO93/08944

PCT Pub. Date: May 13, 1993

[30] Foreign Application Priority Data

Nov. 5, 1991 [DE] Germany ............... 41 36 417.1

[51] Int. Cl.⁶ .................................. B23P 15/28
[52] U.S. Cl. ................ 407/114; 407/115; 407/116
[58] Field of Search ....................... 407/113, 114, 407/115, 116

[56] References Cited

U.S. PATENT DOCUMENTS

| | | | |
|---|---|---|---|
| 4,359,300 | 11/1982 | Hazra | 407/114 |
| 4,846,609 | 7/1989 | Bernadic et al. | 407/114 |
| 4,859,122 | 8/1989 | Patterson | 407/114 |
| 5,147,159 | 9/1992 | Lowe et al. | 407/114 |
| 5,193,947 | 3/1993 | Bernadic et al. | 407/114 |

FOREIGN PATENT DOCUMENTS

| | | |
|---|---|---|
| 0066091A1 | 4/1982 | European Pat. Off. |
| 0278083A1 | 12/1987 | European Pat. Off. |
| 0318000A2 | 11/1988 | European Pat. Off. |

Primary Examiner—Bruce M. Kisliuk
Assistant Examiner—Eileen P. Morgan
Attorney, Agent, or Firm—Herbert Dubno; Andrew Wilford; Yuri Kateshov

[57] ABSTRACT

A polygonal cutter insert is formed with a rake surface extending inwardly from a cutting edge, a breaker chip surface lying in a breaker plane, a groove between the rake and breaker surfaces and at least one longitudinal upwardly convex rib extending outwardly from the breaker chip surface and having an apex lying in a rib plane lower than the breaker plane.

20 Claims, 6 Drawing Sheets

CUTTER INSERT

CROSS REFERENCE TO RELATED APPLICATIONS

This is a national phase application of PCT/DE 92 00886 filed 17 Oct. 1992 and based, in turn, on German application P 41 36 417.1 filed 5 Nov. 1991.

FIELD OF THE INVENTION

The invention relates to a multiple-corner cutter insert for chip-forming machining having at least one face formed as a chip surface with a peripheral edge surface which forms free surfaces, the chip surface having a central raised chip breaker offset from a plane defined by the cutting edges or from a chip-breaker groove having raised portions and formed on or along the cutting edges.

BACKGROUND OF THE INVENTION

German 2,238,631 describes a cutter tool with a chip breaker wherein the groove adjacent the cutting edge has at least one raised frustoconical bump. This cutter is used to break easily raised chips. Also in accordance with German 2,309,443 it is suggested to arrange in the chip-breaker groove a plurality of spaced spherical segment chip-breaker projections.

The known cutter inserts are however only usable, because of the arrangement of the chip-forming elements and the geometry of the chip-breaker groove, in a limited range of different cutting applications, such as somewhat variable cut depths, advances, cutting speeds, and workpieces. In order to increase the application possibilities of the cutter inserts and to better shape and get rid of the chips, German 3,148,535 suggests forming the chip-forming elements generally as truncated pyramids with generally triangular bases with at least one of the base-surface limiting lines being either parallel to the cutter edge or arranged on an arc relative thereto.

According to German 2,810,824 a one-sided cutter insert is proposed which has in the center of its upper side a raised portion which is shaped as a rectangle and has the basic shape of the cutter insert. The corners in particular of the square raised portion can be formed in the middle of the cutter, in particular annularly therearound. Cutter elements are also already known where the central chip breaker is formed as a chip-shaping step and the raised chip former extends to the cutter edge regions. The disadvantage of this embodiment is that cutting with high pressure leads to premature cutter-insert wear. In addition the quality of cut that is achieved is unsatisfactory.

Instead of the highly projecting chip-breaker steps in the corner regions one has used sphere segments or the like before the chip-breaker step and has changed these shapes partially into truncated cones or pyramids. The disadvantage of these cutter inserts that the surface geometry is difficult to produce with powder metallurgy since the chip-forming elements are of complicated shape, that can only be produced with great difficulty in a press. In addition it has been determined that the separate arrangement of the chip-forming elements in the corner regions leads to poor heat transfer which leads also to an increased wear of the cutter plate. In addition formation as an indexable cutter plate for such chip-forming elements is critical as they must serve for chip forming and also as support surfaces (after indexing).

In order to ensure a compensated good chip-forming relationship even with widely varying advances or cutting depths, it has further been suggested in European patent document 278,083 to provide on the chip surface at a right angle to the cutting edge on the bevel region a cutting angle of more than 30° so that the cutting angle is smaller with increasing spacing from the bevel and to provide chip ribs projecting from the chip surface in the chip surface regions between the cutter-corner regions of the cutter body in the chip-movement direction and with lateral spacing from one another, between which further bumps with run-on ramps are provided. The corner regions have three adjacent stepped bumps including two outer ones with inclined axes parallel to the adjacent chip ribs. Even this cutter plate is only usable on one face since the chip breaker cannot form a sufficiently solid mounting surface.

European patent document 143,758 has longitudinally extending ridges which are trapezoidal in cross section and which extend parallel to the cutting edge. These ribs are interrupted by notches.

The prior-art cutter plates with chip-forming elements for producing coil chips have not worked.

OBJECTS OF THE INVENTION

It is an object of the present invention to provide the cutter insert having surface geometry that can be produced by powder metallurgy without waste so that it can if necessary be formed as an indexable cutter plate. Still another object is to provide the cutter insert having the smallest possible pressure in the cutter corners with good heat transfer away from the cutter corners.

SUMMARY OF THE INVENTION

The objects are attained by the polygonal cutter insert having the chip breaker extended as, at least, one wedge-shaped longitudinal rib in the chip runout region. The particular advantage of this invention is that, as a result of the long extension of the longitudinal ribs, the cutter inserts are usable for various cutting conditions from fine machining to so-called average machining with different cut depths as well as rough machining. The production of irregular chips is avoided since the exiting chip is guided by the longitudinal rib or ribs and is deflected and shaped with low friction. The direct connection of the longitudinal rib or ribs with the (central) chip breaker improves the heat conduction from the cutter corner regions so that high wear is avoided. The central chip breaker together with the adjacent longitudinal ribs is well suited for production by powder metallurgy since releasing the blank from the press tool is easy without leaving pieces in the tool. This improves the production rate since rejects are avoided. In addition the press tool only needs to be cleaned at much greater intervals than hitherto.

The longitudinal ribs are preferably also substantially lower than the chip breaker of the central chip-forming plane. In this manner the advantageous combination of good chip formation and guiding with relatively low wear is achieved in the regions adjacent the cutting edge.

Preferably the chip breaker is extended to the cutter corner region in the form of at least one longitudinal rib which is arranged symmetrically to a bisector of the cutter corner angle and whose longitudinal axes have a common intersection in the region of the chip breaker. This also includes the one-rib embodiment where the longitudinal rib or its longitudinal central axis lies on the bisector, and the embodiments wherein, if necessary, additional longitudinal ribs are provided to both sides of the angle bisector. Preferably with this embodiment two to five longitudinal ribs are provided at each corner.

The angle between the longitudinal axis of the longitudinal rib and the angle bisector of the cutter corner is 0° or between 15° and 45°, preferably 15° to 30°. The 0° position is only used with odd numbers of longitudinal ribs, that is when the remaining ribs are symmetrical to the center one and are arranged directly in the cutter corner. The selection of the direction of the longitudinal ribs can be varied also with respect to the cutter-corner radius as well as in asymmetrical shapes. Thus the longitudinal rib or ribs can also be arranged asymmetrically to the cutter-corner angle bisector with their longitudinal axis or axes and or their longitudinal axes and the angle bisector having a common intersection on the chip breaker. The asymmetry can be so great that according to cut conditions and material machining the longitudinal ribs are of different lengths, that is they are shorter further from the cutting corner.

Preferably a mirror-symmetrical arrangement of the chip breaker to at least one central perpendicular of a connecting line between two cutter corners is used, in particular with rectangular cutter inserts with a greater length than width.

The invention also includes such combinations where the central raised chip-forming plane is extended with at lest one nose-like projection as well as a longitudinal rib extending therefrom. The prior art describes cutter inserts with a central raised chip-forming plane which is connected via a bevel in edge regions limiting the cutter edge or edges or by chip-forming grooves. According to the invention the chip-forming plane is extended as nose-like projections and then relatively narrow longitudinal ribs. In effect there here is a "big nose" and a "small finger." Preferably the nose-like projections have a grater height than the longitudinal ribs, while in particular the nose-like projections have an outer surface lying in the same plane as the central chip-forming plane.

The cutter-corner radii vary between 0.2 and 2.4 mm, preferably between 0.2 and 1.6 mm.

According to another embodiment of the invention the longitudinal ribs end at a spacing of from 0.04 to 0.8 mm, preferably 0.04 to 0.3 mm, from the cutter edge. This has the effect that the running-off chip moves first on the chip surface or the chip-breaker groove before it contacts a longitudinal rib which plastically deforms the chip and deflects it perpendicular to the chip surface. When a chip-breaker groove (with or without a bevel connected to the cutter edge) is provided, the upper surface of the longitudinal rib according to a real embodiment lies underneath the surface of the central chip breaker. The height of the longitudinal ribs is according to another feature of the invention 0.03 mm to 0.5 mm, preferably 0.03 mm to 0.08 mm.

In order to avoid a sharp-edge transition to the cutter face which could easily lead to chipping the longitudinal rib is preferably formed convex without sharp edges. In particular the convex shape has in the upper region a radius between 0.1 and 0.5 mm, preferably 0.1 to 0.3 mm. The longitudinal rib extends to the surrounding chip surface or to the chip-breaker groove under a larger radius as in the upper region, preferably under an angle of at least 45° relative to the perpendicular. This produces a parabolic cross-sectional shape.

In top view the longitudinal ribs are wedge-shaped on their ends turned toward the cutter corners and preferably have an apex angle below 20° (measured on the longitudinal axis). In section parallel to the cutter edge (or a plane tangent thereto) the side surfaces of the longitudinal rib form in the region of the chip surface or the chip-breaker groove an angle between 80° and 120°, preferably between 90° and 100°. The longitudinal rib also extends along the longitudinal axis convexly with the angle to the cutter corner being as sharp as possible, that is under 10°. The rib width, measured in the region of the chip surface or the chip-breaker nut, is between 0.2 and 1.5 mm. The length of the ribs, measured from the connection part on the central chip breaker to the point is five to twenty times greater than this basis width.

Preferably the central chip breaker rises from the plane defining the cutter edge at an angle of 20° to 40°, it can according to another embodiment also be rounded and have a convex upper surface.

BRIEF DESCRIPTION OF THE DRAWING

The above and other objects, features, and advantages will become more readily apparent from the following description, reference being made to the accompanying drawing in which.

FIGS. is 8a through 8c three different views of a cutter plate with only one longitudinal rib.

SPECIFIC DESCRIPTION

The cutter insert shown in the figures has a top surface formed as a chip face 10 and as an edge surface 11 perpendicular or at a corresponding rake angle thereto that together form the respective cutting edge 12. The cutter insert can have any shape normally used in practice, in particular it can be triangular, rectangular, or rhombic. Normally the indexable cutter plate has either a central bore or special bearing surfaces or grooves for clamping.

The chip face 10 has a central chip breaker 13 which is at a spacing from the respective cutting edge 12 and is raised. Between the chip breaker 13 and the cutting edge there is a chip-breaking groove 14 which is formed in the normal manner.

The present invention is characterized in that the chip breaker 13 is extended to the cutting edge region in the form of two, three, four, or five longitudinal ribs 15 which are arranged symmetrically to a bisector 16 of the cutter corner and whose longitudinal axes 17 have a common intersection in the region of the chip breaker 13. The angle 19 between the longitudinal axis 19 and the cutting-corner bisector 16 according to FIG. 2 with only two longitudinal ribs is 30°. When more than two longitudinal ribs are provided, the respective angle 19 between the longitudinal rib immediately adjacent the cutting-edge bisector 16 or between the longitudinal axes 17 of two adjacent longitudinal ribs 15 is 30°. The angle can however be varied between different corner radii which lie between 0.2 and 2.4 mm. The longitudinal ribs 15 form a fan-like extension from the raised region of the chip breaker 13 toward the cutting edge. The longitudinal ribs terminate at a spacing 20 of from 0.05 to 0.8 mm or at most 0.3 mm for fine-machining tools.

Figure 4:
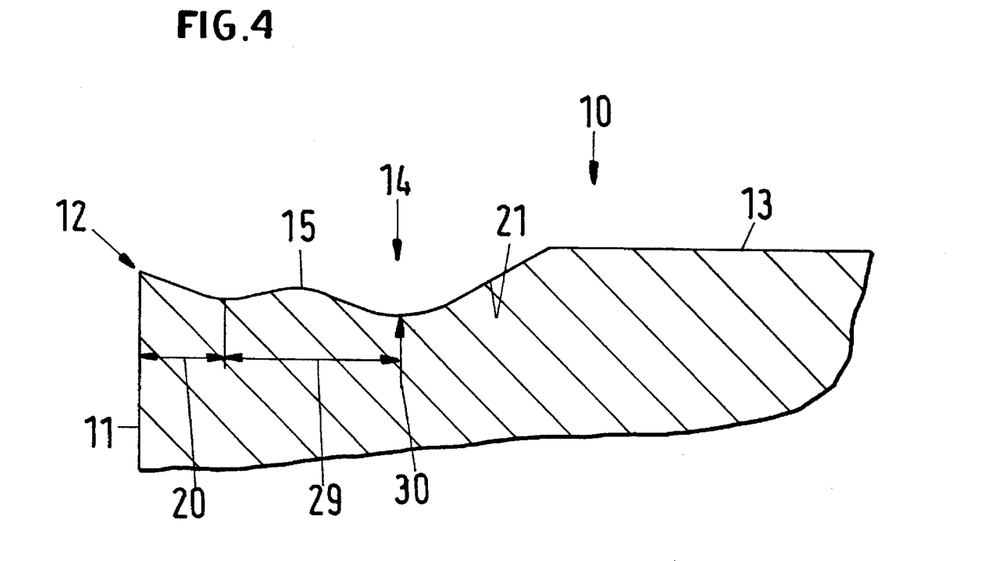
FIG. 4 a section taken along line A—A of FIG. 2.
Figure 6:
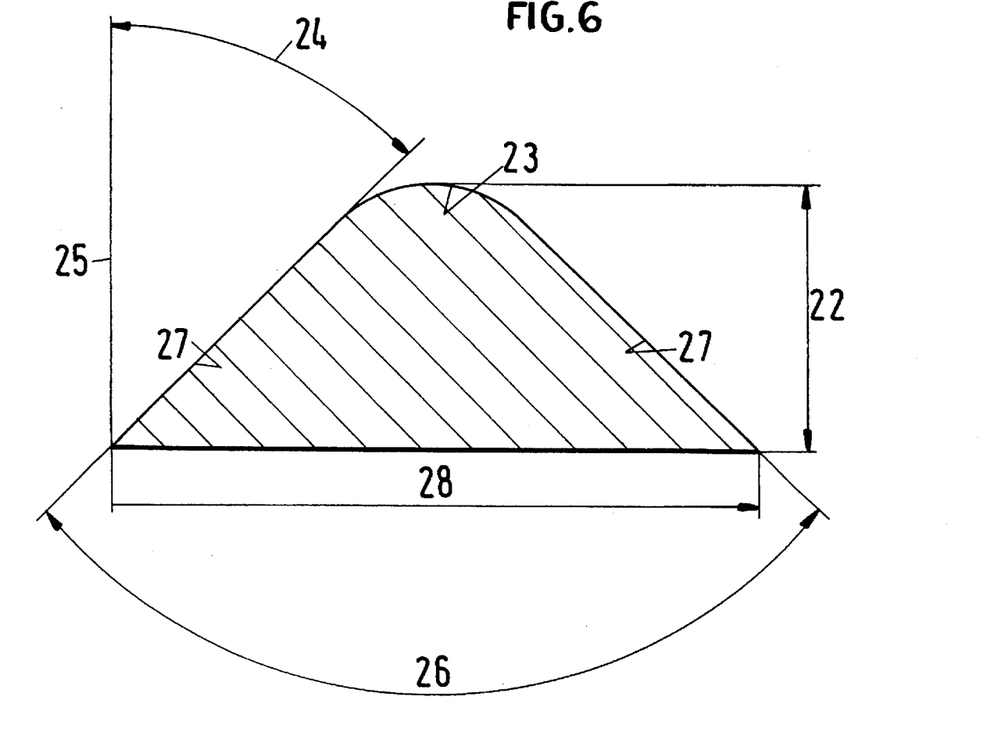
FIG. 6 is a section taken along line B—B of FIG. 2.

The amount that the longitudinal ribs 15 are raised from the chip-breaker groove or relative to the chip breaker 13 is visible in FIG. 4. In the there illustrated embodiment the chip-breaker groove descends at the cutting edge at an angle of about 20°. The angle of climb of the surface region 21 of part of the chip breaker 13 is somewhat higher and can reach 30°. The longitudinal rib 15 has relative to the surrounding surface or the chip-breaker groove 15 a height 22 of between 0.03 mm and 0.5 m., preferably at most 0.08 mm for fine-machining tools. The height 22 of the longitudinal rib 15 is however substantially smaller than height of the chip breaker 13 defined by the cutting-edge plane. As particularly visible in FIGS. 4 and 6 the longitudinal ribs have as seen from the front a convex shape with no sharp edges, having in cross section a radius 23 of at most 0.5 mm, preferably 0.3 mm. The radius increases to the chip surface or toward the chip-breaker groove 14 so that an angle 24 of 45° is formed with respect to a perpendicular 25 to the chip surface or to the chip-breaker groove 14. As seen in FIG. 6 an angle 26 of about 90° is formed between the side surfaces 17 of the longitudinal rib 15. The maximum width of the longitudinal ribs 15, that is the base width measured at the chip surface or the chip-breaker groove is 0.5 to 1.5 mm while the length 29 of the longitudinal ribs measured from the foot 30 of the chip breaker 13 is five to twenty times greater than this base width.

The cutter insert is formed by powder metallurgy with the assistance of a die. This die is formed so as to produce the blank shown in FIG. 5 where adjacent the surface 21 there is a surface portion 31 that forms a small angle to the horizontal. The region shown at 32 is ground off to finish the desired cutter plate.

Figure 5:
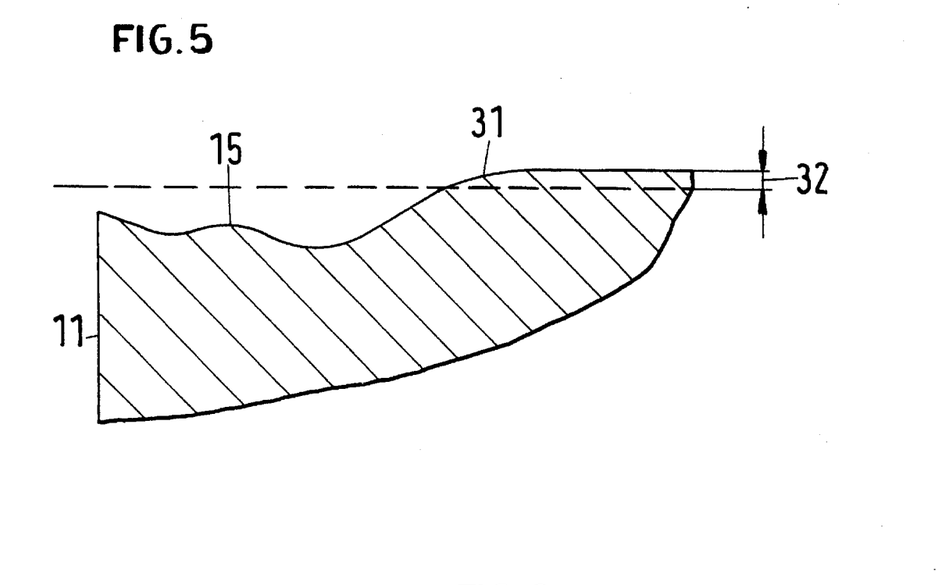
FIG. 5 a section like FIG. 1 is of a cutting-plate blank.

The surface portion shown at 21 can be round, that is convex.

Figure 1:
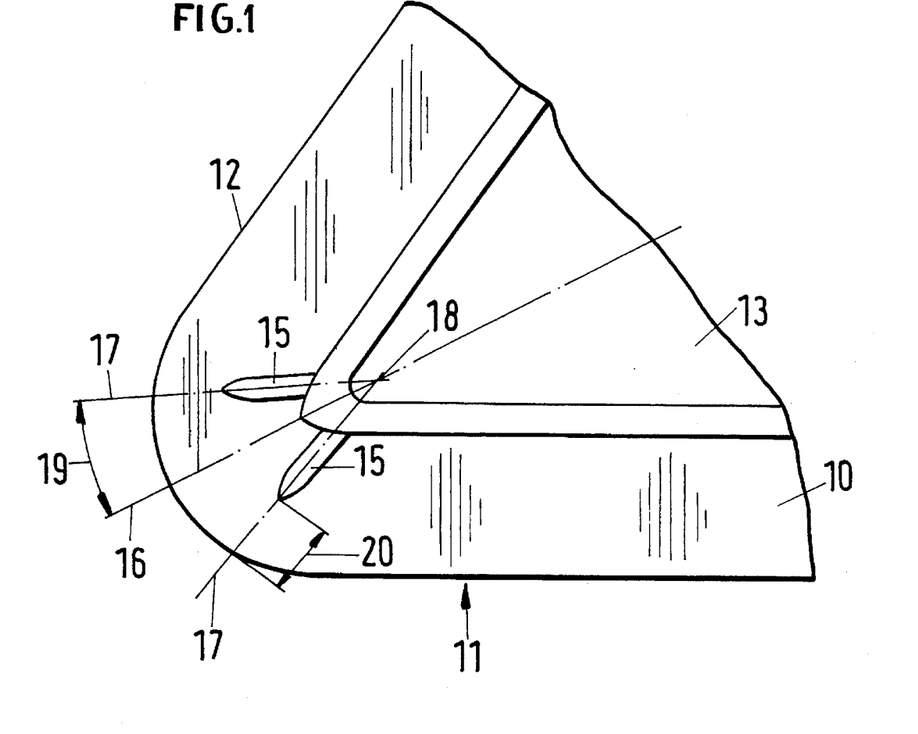
FIGS. 1 through 3 are respective top views of the cutting corner region of a indexable cutter plate according to the invention.
Figure 2:
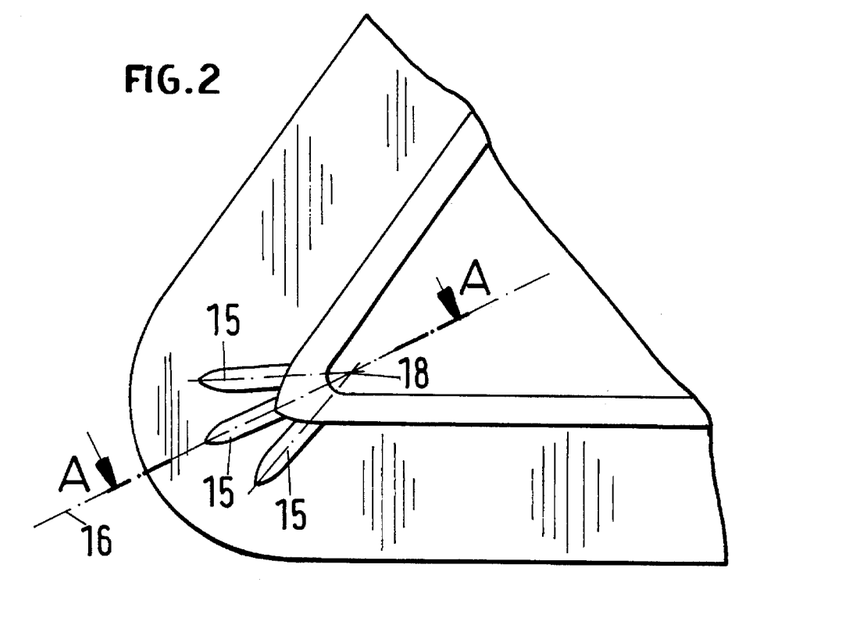
Figure 3:
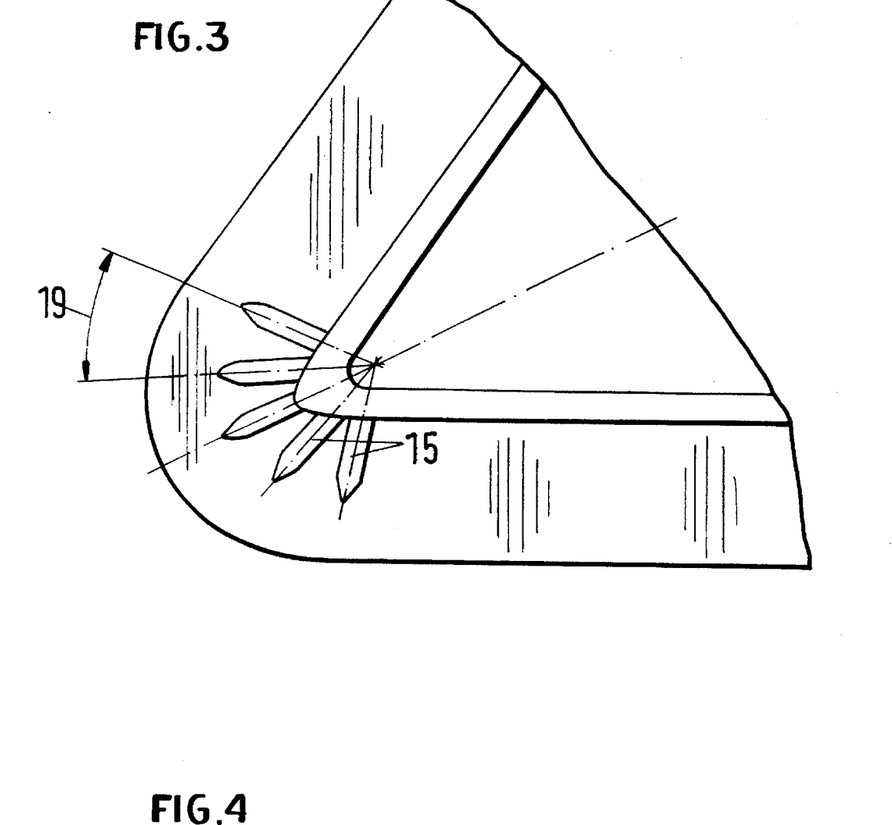
Figure 7:
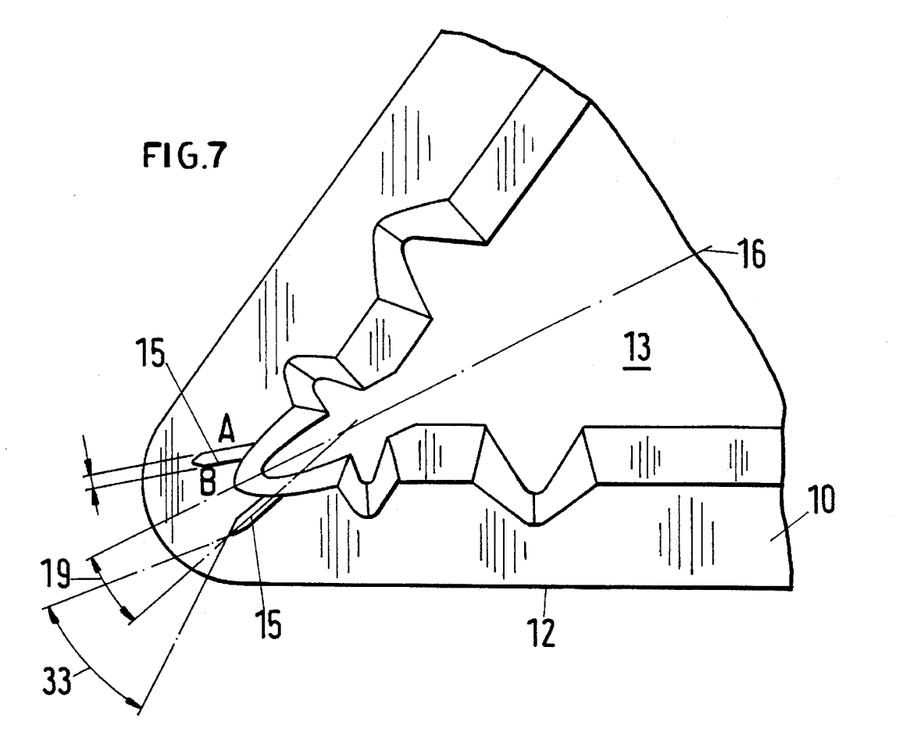
FIG. 7 is a top view of a cutting corner region of a indexable cutter plate according to the invention with a differently formed central chip breaker.

The longitudinal ribs extend toward the cutting edge as seen in top view in FIGS. 1 to 3 somewhat at an angle and the angle 33 shown in FIG. 7 is a maximum of 20°.

FIG. 7 shows a cutter insert with a central chip breaker which on its edge across from the respective cutting edge 12 has a limiting surface that is not straight but scalloped so as to form individual extensions toward the respective cutting edge.

According to a further embodiment the formation according to the invention of the chip-forming elements can also be applied to cutter inserts for engraving, turning, cutoff turning, double cutoff turning, and similar processes where the cutter insert is not symmetrical but instead is only used with one side of the chip surface. Such a cutter insert is shown in three views in FIGS. 8a through 8c. The cutter insert which is square in top view and has two sides has a central bore 34 and two opposite chip surfaces 36 extending at an angle 35 between 5° and 20°, preferably 10° to 15°, to each other and of square shape seen in top view. The cutter insert has two opposite rounded cutting edges with an open angle 37 of 30° to 60°, preferably 45° to 50°. The radius 38 of the cutting-edge rounding is between 1 and 10 mm, preferably between 1.5 and 5 mm. The chip surface 36 has a portion raised 0.1 mm (relative to the cutting-edge plane) so that the raised portion 39 functions as a chip former and extends at at least one longitudinal rib 15. The asymmetrical cutting-body shape seen in FIG. 8b has only one longitudinal rib while the symmetrical form of the chip former 40 of FIG. 9 has two longitudinal ribs 15. In both cases the main chip former 39, 40 must be so constructed that the cutting edge is exposed and the main chip-forming element extends in the use region to the cutting edge somewhat as a point. This rounded-point longitudinal rib is extended at an angle 41 of between 0° and 90°, preferably 10° to 50°, as the rib 15 without a gap. The longitudinal ribs 15 are so formed in this embodiment that the surface limiting their bases run parallel toward the chip surface or to a chip-breaker groove formed there and are only tapered together as a wedge with an apex angle between 10° and 20°.

Figure 8A:
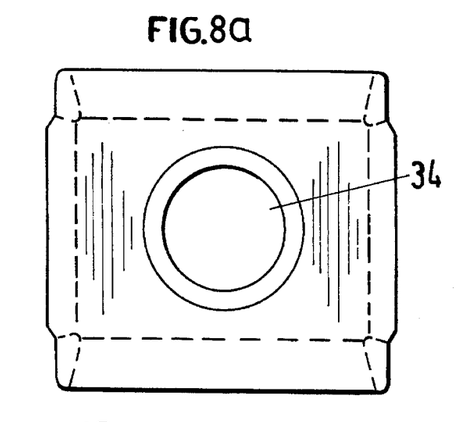
Figure 8B:
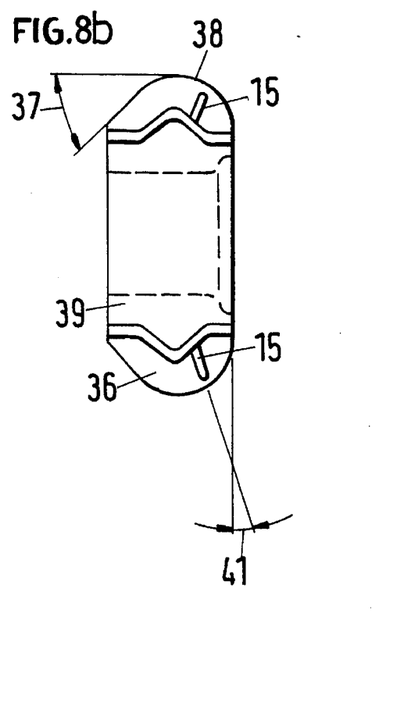
Figure 8C:
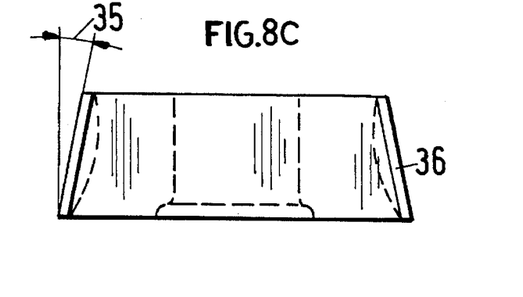
Figure 9:
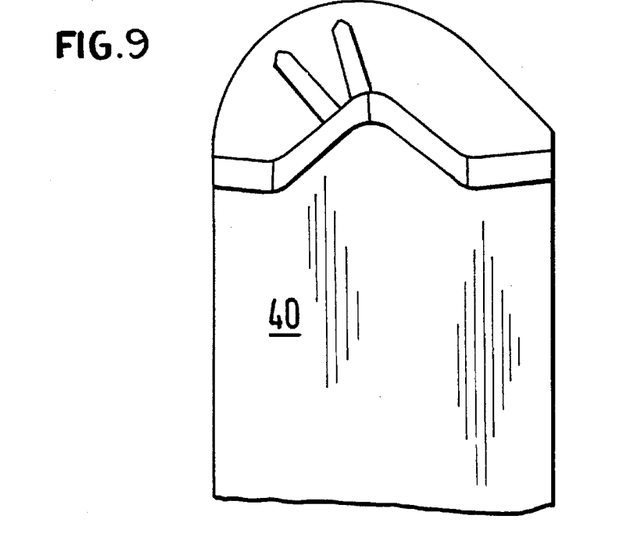
FIG. 9 is a detail view of the cutter insert according to FIG. 8a with two longitudinal ribs.
Figure 10:
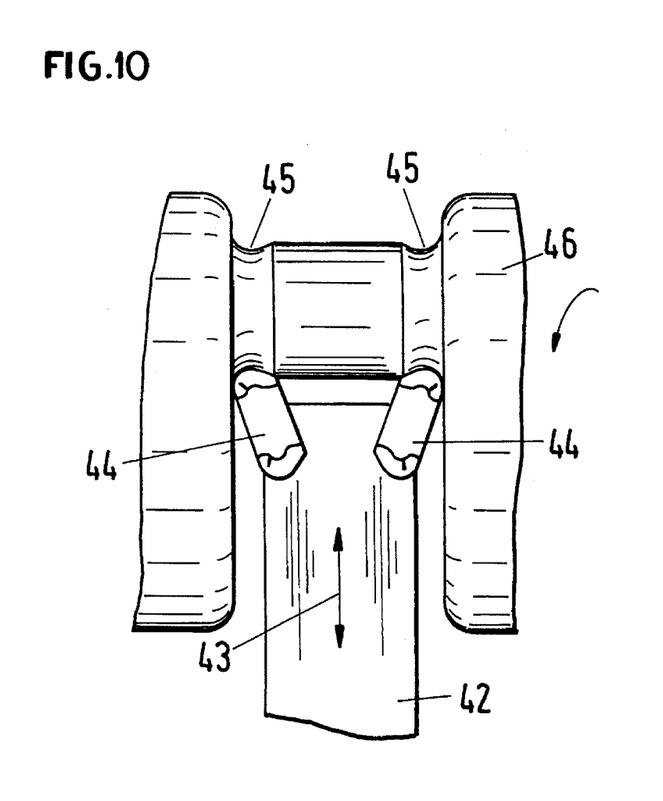
FIG. 10 is cutter inserts according to FIGS. 8a through 8c and 9 in use, here turning a cam shaft.

FIG. 10 shows the cutter plate according to FIGS. 8 and 9 in use. A common carrier tool 42 which is movable in the direction of double arrow 43 holds two cutter inserts 44 for turning fillets 45 of a crank shaft 46. The cutter inserts 44 are directed during turning toward the center of the workpiece.

Figure 11A:
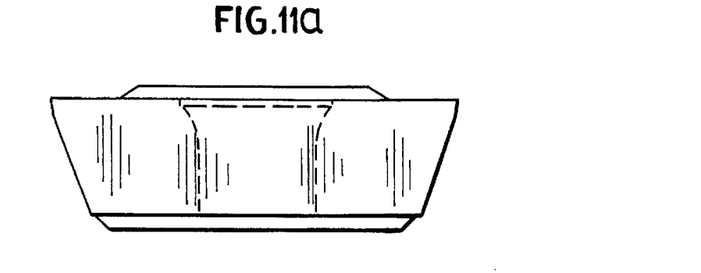
FIGS. 11a through 11c and three different views of a four-corner cutter plate.
Figure 11B:
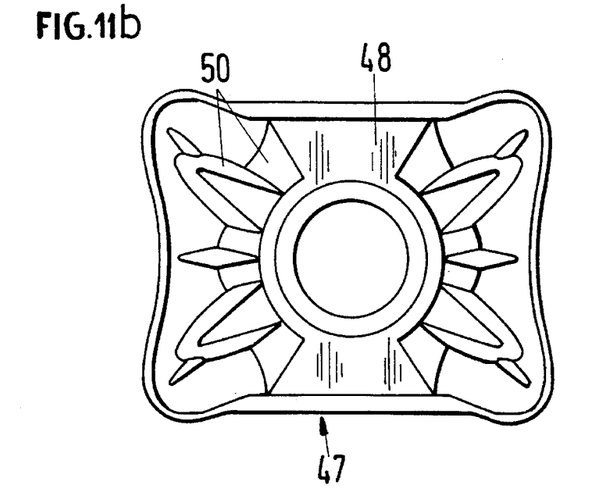
Figure 11C:
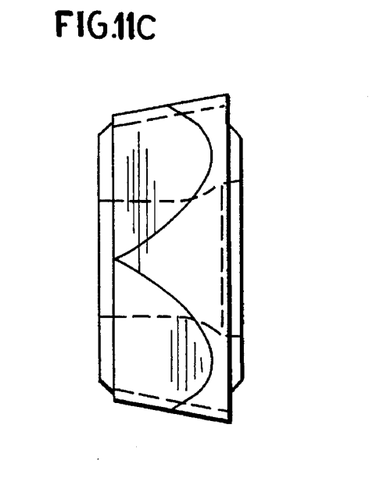
Figure 11D:
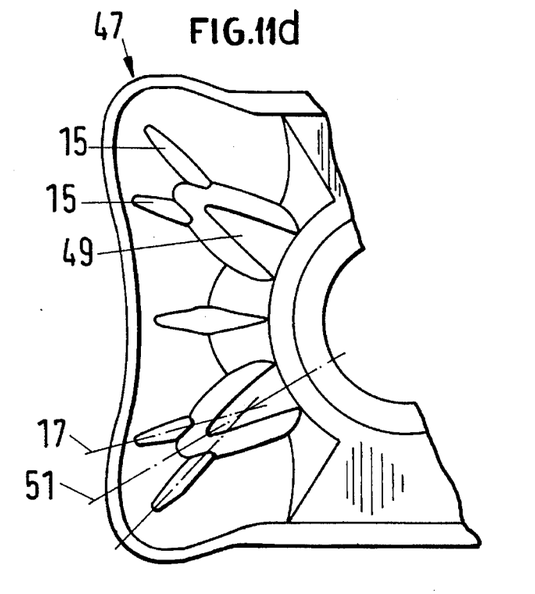
FIG. 11d is an enlarged detail view of this cutter insert.

The cutter insert shown in FIGS. 11a through 11d has on each of its narrow edges a respective main cutting edge which is limited by a cutting corner. As particularly visible in FIG. 11b, a chip-forming plane 48 extends over the plane of the four cutting corners so that this chip-forming plane 48 is joined at a bevel 50 to the last-named region. The chip-forming plane 48 is extended (see FIG. 11d) in the region of the main cutting edge first into a nose-like projection 49 whose upper surface is at the same level as the top surface of the chip-forming plane 48. Even this nose-like projection drops off on the same bevel 50, in particular its front end has one or two longitudinal ribs 15 (see FIGS. 11b and 12d). As can be seen in FIG. 11d the longitudinal center axis 51 of the nose 49 as well as the longitudinal axis 17 of the longitudinal ribs intersect at a common point on the nose which is part of the chip breaker. As particularly visible in FIG. 11d, it is not essential that the nose or its longitudinal axis lie exactly on the bisector of the cutting corner, that arrangement can be somewhat offset as illustrated. In addition depending on the machining process the longitudinal ribs can also be asymmetrical to the angle bisector or to the nose or its longitudinal axis. Finally according to the representation of FIG. 11d the length of the longitudinal ribs 15 can be different.

In the indexable cutter plates formed according to the instant invention of the DNMG150612 cutting speeds of 160 m/min are used to cut a CK45N workpiece. In particular with a cutting depth of 4.0 mm it is possible to make higher passes with cleaner chip formation with the cutter plate according to the invention in contrast to the known plates of the prior art. The same results are obtained in the working of X5CrNi18.9.

I claim:

1. A polygonal cutter insert for chip-forming machining comprising:

a cutter body;

a side cutting edge periphery on said cutter body formed with a cutting edge lying in an edge plane;

a recessed rake surface running downwardly inwardly from said edge;

a unitary chip breaker segment spaced inwardly from said rake surface all around said edge periphery and having a continuous top breaker surface lying in a breaker plane above said edge plane;

a groove located between said rake surface and said chip breaker segment and defining a boundary of said chip breaker segment; and at least one longitudinal wedge-shaped upwardly convex rib extending outwardly from said breaker segment into said rake surface and terminating at a distance from said edge periphery, said rib having an apex lying in a rib plane lower than said cheap breaker plane.

2. The polygonal cutter insert defined in claim 1 wherein said rib plane is lower than said edge plane.

3. The polygonal cutter insert defined in claim 1 wherein said cutting edge periphery is formed with at least one cutter corner having a longitudinal axis of symmetry, said insert comprising at least one other convex rib.

4. The polygonal cutter defined in claim 3 wherein said one and other ribs being spaced symmetrically with respect to said axis of symmetry at an angle, imaginary extensions of said ribs and said axis of symmetry having a common intersection within the boundary of the chip breaker segment.

5. The polygonal cutter insert defined in claim 3, further comprising at least three further convex ribs, one of said further ribs extending along said axis of symmetry, each of the ribs having a respective longitudinal rib axis spaced from the rib axis of an adjacent rib at an angle between 15° and 45°.

6. The polygonal cutter insert defined in claim 3 wherein said one and other longitudinal ribs are spaced apart and asymmetrical with respect to the axis of symmetry of the cutting edge, imaginary extensions of said ribs and said axis of symmetry having a common intersection within the boundary of the chip breaker segment.

7. The polygonal cutter insert defined in claim 3 wherein said one and other convex ribs are of different lengths.

8. The polygonal cutter insert defined in claim 3 wherein said cutter corner has a radius between 0.2 and 2.4 mm.

9. The polygonal cutter insert defined in claim 1 wherein said one longitudinal rib ends at the distance from 0.05 to 0.8 mm from the cutting edge.

10. The polygonal cutter insert defined in claim 1 wherein said apex rises to a height between 0.3 and 0.5 mm with respect to a bottom of said groove, said height being smaller than a height to which said chip breaker rises above said edge plane.

11. The polygonal cutter insert defined in claim 1 wherein said convex rib in a direction parallel to the cutting edge has an arc lying in said rib plane and having a radius from 0.1 to 0.5 mm and an angle of curvature between 80° and 120°.

12. The polygonal cutter insert defined in claim 1 wherein the one rib is formed with opposite longitudinal sides tapering outwardly toward one another at an angle less than 20° defining thereby an outer end of said one rib.

13. The polygonal cutter insert defined in claim 12 wherein each of said longitudinal sides is inclined to a vertical at an angle at least equal to 45°.

14. The polygonal cutter insert defined in claim 1 wherein said rib has a base which in a direction parallel to said cutting edge has a width 0.2 to 1.5 mm.

15. The polygonal cutter insert defined in claim 14 wherein said rib has a length from five to twenty times greater than said width of the base.

16. A polygonal cutter insert for chip-forming machining comprising:

a cutter body;

a multi-corner side edge periphery on said cutter body formed with a cutting edge lying in an edge plane;

a rake surface lying inwardly from said edge;

a central chip breaker zone defined by said rake surface and formed as an island spaced inwardly all around said edge periphery and at least one formation extending outwardly therefrom toward said cutting edge, said island and said formation having a common continuous top breaker surface lying in a breaker plane extending above said edge plane; and at least one longitudinal upwardly convex rib extending outwardly from said formation into said rake surface and terminating at a distance from said edge periphery, said rib having an apex lying in a rib plane lower than said breaker plane.

17. The polygonal cutter insert defined in claim 16 wherein said central chip breaker zone is formed with a breaker peripheral surface extending angularly downwardly and outwardly from said top breaker surface and terminating in said edge plane.

18. The polygonal cutter insert defined in claim 17 wherein said breaker peripheral surface is beveled at an angle from 20° to 40°.

19. The polygonal cutter insert defined in claim 17 wherein said formation has a rounded end facing a respective corner and said top breaker surface being upwardly convex.

20. The polygonal cutter insert defined in 16 wherein said insert is rectilinear, said central chip breaker zone being formed with another three formations each facing a respective one of the corners, each pair of adjacent formations being symmetrical with respect to an axis of symmetry extending through a center of said breaker zone and perpendicular to a line connecting respective corners juxtaposed with respective formations of said pair.

* * * * *